(12) United States Patent
Betzler

(10) Patent No.: US 10,781,886 B2
(45) Date of Patent: Sep. 22, 2020

(54) RAPIDLY RELEASABLE LATCHING ARRANGEMENT FOR A COMPONENT FROM LIFTING, LASHING OR FASTENING TECHNOLOGY

(71) Applicant: RUD Ketten Rieger & Dietz GmbH u. Co. KG, Aalen (DE)

(72) Inventor: Michael Betzler, Abtsgmund (DE)

(73) Assignee: RUD KETTEN RIEGER & DIETZ GMBH U. CO., KG, Aalen (DE)

( * ) Notice: Subject to any disclaimer, the term of this patent is extended or adjusted under 35 U.S.C. 154(b) by 296 days.

(21) Appl. No.: 15/763,575

(22) PCT Filed: Sep. 28, 2016

(86) PCT No.: PCT/EP2016/073031
§ 371 (c)(1),
(2) Date: Mar. 27, 2018

(87) PCT Pub. No.: WO2017/055308
PCT Pub. Date: Apr. 6, 2017

(65) Prior Publication Data
US 2018/0274630 A1 Sep. 27, 2018

(30) Foreign Application Priority Data
Sep. 29, 2015 (DE) .................. 10 2015 218 799

(51) Int. Cl.
*F16G 15/06* (2006.01)
*F16G 15/04* (2006.01)

(52) U.S. Cl.
CPC ............ *F16G 15/06* (2013.01); *F16G 15/04* (2013.01)

(58) Field of Classification Search
CPC ........... F16G 15/04; F16G 15/06; F16G 15/02
See application file for complete search history.

(56) References Cited

U.S. PATENT DOCUMENTS

| 4,102,124 A | 7/1978 | Swager |
| 8,104,988 B2 * | 1/2012 | Lunn .............. F16G 15/06 403/154 |

(Continued)

FOREIGN PATENT DOCUMENTS

| CN | 202107433 U | 1/2012 |
| FR | 2382624 | 9/1978 |

(Continued)

OTHER PUBLICATIONS

Second Office Action issued in related Chinese Application No. 201680057102.4, dated Oct. 9, 2019. English translation included.

(Continued)

*Primary Examiner* — Pradeep C Battula
(74) *Attorney, Agent, or Firm* — Barnes & Thornburg LLP; Jeffrey R. Stone

(57) ABSTRACT

The invention relates to a latching arrangement, in particular for a component from lifting, lashing or fastening technology. The latching arrangement has a first component provided at its one end with at least one laterally protruding, spring-tensioned latching projection, and a second component provided with a receptacle configured to receive in an insertion direction and to fasten rotatably the end of the first component. The second component comprises a latching recess for the latching projection, wherein the latching recess is bounded at least at one side by a release shoulder displaceable into the latching recess which is provided with a hand switch arranged so as to be accessible from outside the latching arrangement, which hand switch is connected in a movement-transmitting manner to the release shoulder and closes the receptacle. By simple actuation of the hand switch, the latching can be repeatedly and easily released.

20 Claims, 3 Drawing Sheets

(56) References Cited

U.S. PATENT DOCUMENTS

| | | | |
|---|---|---|---|
| 8,677,727 B2* | 3/2014 | Robins | F16G 15/06 59/86 |
| 8,807,617 B2* | 8/2014 | Smetz | B66C 1/66 294/215 |
| 9,903,440 B2* | 2/2018 | Ohman, III | F16G 15/06 |
| 2014/0186105 A1* | 7/2014 | Martinelli | F16G 15/06 403/320 |

FOREIGN PATENT DOCUMENTS

| | | |
|---|---|---|
| JP | 2003254393 | 9/2003 |
| WO | WO89/00249 | 1/1989 |

OTHER PUBLICATIONS

International Search Report from related application No. PCT/EP2016/073031, dated Dec. 22, 2016.
Chinese First Office Action for Chinese Application No. 201680057102.A, dated Apr. 11, 2019, and its English translation.
Third Office Action issued in related Chinese Application No. 201680057102.4, dated May 8, 2020. English translation included.

* cited by examiner

RAPIDLY RELEASABLE LATCHING ARRANGEMENT FOR A COMPONENT FROM LIFTING, LASHING OR FASTENING TECHNOLOGY

The invention relates to a latching arrangement for a component from lifting, lashing or fastening technology, for example a master link, a shackle, a tensioning device for chains, ropes or belts, a claw for shortening chains, components to be hung into chains, ropes and/or belts, and catches or carabines.

In DE 33 04 603 C2, a component, in particular a shackle, into which a bolt is screwed is shown. The bolt is secured by an adapter sleeve. The bolt is not rotatable so that there is a risk of its one-sided wear in operation.

The risk of one-sided wear does not exist with the component of DE 22 34 536 C3 as the bolt is secured by an adapter sleeve in a circumferential groove and is therefore rotatable. However, the bolt will become unsecured as soon as the adapter sleeve is worn which may absolutely occur.

Moreover, a combination of the components of DE 33 04 603 C2 and DE 22 34 536 C2 is known where the threads permit the bolt to be screwed through until the threads are disengaged. When the threads are disengaged, the bolt is secured by an adapter sleeve in a circumferential groove. With this solution, the bolt is rotatable and remains secured by the threads even if the adapter sleeve is worn.

A component for plain coil chains is described in DE-OS 2 221 633. Two bolts are fixed in the component and retained by securing elements, also in the form of adapter sleeves. The shortening claws for chain strands, as they are represented in DE 10 2008 028 111 A1, or DE 10 2005 035 375 A1, or DE 10 2005 019 651 A1, comprise bolts secured by tension pins. The bolts in tensioning devices are also secured by adapter sleeves, as is shown in DE 71 15 968 U1.

A component in the form of an end fitting for load lifting or lashing straps is known from DE 28 04 735 C3 where bolt-like crossbeams are inserted into flanges of an eye-like upper part. The loops of straps are hung up at the crossbeams. The crossbeams are secured by supporting forks and securing sleeves.

In all these components, the complex assembly of the bolts is disadvantageous.

It is therefore an object of the invention to provide securing means by which, for example, the bolts of the components of the fastening, lashing and lifting means may be easily fixed and released without any additional securing element, for example in the form of a tension pin, being required. It is important in this context that the bolt can still rotate freely so that its complete surface will be uniformly worn.

The solution according to the invention provides a latching arrangement for a component from lifting, lashing or fastening technology having a first component which is provided at its one end with at least one laterally protruding, spring-tensioned latching projection, and having a second component which is provided with a receptacle in which the end of the first component can be received in an insertion direction and can be fastened rotatably, and which comprises a latching recess for the latching projection, wherein the latching recess is bounded on at least one side by a release shoulder which is displaceable into the latching recess which is provided with a hand switch which is arranged so as to be accessible from outside the latching arrangement which is connected in a movement-transmitting manner to the release shoulder and closes the receptacle.

The solution according to the invention has the advantage that the first and the second components may be rapidly and securely connected to each other due to the latching, and the time-consuming securing by an adapter sleeve is omitted. The mounting of the first component, which may in particular be designed as a bolt, in the receptacle of the second component, for example a bow, is effected by the spring-tensioned latching projection which engages into the latching recess. No additional securing element is required. By actuating the hand switch, the displaceable release shoulder may be furthermore shifted into the latching recess so that the latching connection may be easily released. By designing the hand switch as a lock for the receptacle, the latching arrangement is protected from dirt. Moreover, the hand switch is thereby arranged in a space-saving and secure manner.

The invention may be further improved by a number of independent developments each per se advantageous which may be arbitrarily combined with each other and which will be described below.

According to a first advantageous embodiment, a height of the release shoulder may correspond to a height of a shoulder opposite the displaceable shoulder preferably opposite to the insertion direction, or to a shoulder adjacent to the release shoulder in the insertion direction. When the release shoulder is shifted, in this embodiment, into the latching recess, the latching projection will be lifted to the level of the other shoulder by the release shoulder. The latching projection may be shifted to the other shoulder by the release shoulder to completely release the latching. The first component may thus be rapidly and easily separated from the second component.

The release shoulder may be provided with a guide bevel facing the latching projection in the latched state, and/or the latching projection may be provided with a guide bevel facing the release shoulder in the latched state. By the guide bevel, the latching projection may be more easily moved onto the release shoulder when the release shoulder is being moved into the latching recess. That means, this embodiment facilitates the release of the latching connection between the first and the second components.

The latching projections may radially protrude from a circumferential surface of the bolt and be retained so as to be able to be pressed in, in the radial direction, against the action of a spring.

To enable the first component to be inserted into the second component in an insertion direction without major expenditure of force, the latching projection is lying in the shadow of the second component at least in the insertion direction, that means it does not protrude.

It is furthermore advantageous for the release shoulder to be inclined in such a way that the release shoulder is automatically pushed out of the latching recess during latching by the spring tension of the latching member without there occurring any self-locking by friction. Simultaneously, the guide bevel should be inclined such that, during the actuation of the hand switch, the release shoulder will move the latching projection out of the latched state without any self-locking.

To obtain a smooth-running relative displaceability between the latching projection and the release shoulder without any self-locking due to static friction taking place, an angle of the guide bevel relative to the direction into which the release shoulder can be shifted should be located outside the cone of friction onto the opposite surface, for example, of the latching projection associated to the release shoulder. The cone of friction may be determined for the respective surface pairing by trials or via tables. An angle within the cone of friction would lead to self-locking due to static friction when the latching projection and the release shoulder are pressing against each other.

The release shoulder may be spring-tensioned by an additional spring. In this manner, the release shoulder always assumes a predetermined original position. The original position into which the release shoulder is pushed by the additional spring preferably corresponds to the position in which the release shoulder is located when the latching projection is inserted. The flange switch is thus always in the position from which the latching may be released.

For the first component to be rotatably secured in the second component, in a first variation, the latching recess may be rotatably fixed, together with the latching projection, at the first component. As concerns the efforts, however, it is easier to design the latching recess, according to a further variation, annularly, in particular annularly closed. In the annular latching recess, the at least one latching projection may be rotatably received while it is simultaneously secured in the axial direction. A complete rotatability about 360° may be achieved if the latching recess is continuously annular. Thus, the at least one latching projection may freely rotate in the latching recess in the circumferential direction thereof, or the first component may freely rotate about its axis, respectively.

The release shoulder may limit the latching recess in particular at one of the sides of the latching recess which are opposite in the insertion direction. To permit a release independent of the rotational position of the at least one latching projection, it is advantageous to design the release shoulder annularly, in particular annularly closed, for example as part of a displaceable sleeve. In this embodiment, the release shoulder may be moved over the complete ring circumference in one movement into the latching recess and lift the latching projection from the latching recess there. Preferably, the release shoulder is located behind the other shoulder bounding the latching recess in the insertion direction.

The hand switch may be designed, in a variation, in the form of a plate or cap. The release shoulder may be embodied by a collar of the cap. The collar may project from the hand switch into the receptacle in the opposite direction.

The hand switch or the cap may be retained in the receptacle in particular in parallel to the insertion direction in a displaceable manner. The hand switch may be formed by a base surface of the cap. This base surface may be in particular plane.

These embodiments lead to a particularly rapidly releasable latching arrangement: To release the latching, the base surface of the cap only has to be moved in such a way that the release shoulder connected to the hand switch in a movement-transmitting manner enters the latching recess. According to a variation, the hand switch only has to be moved towards the first component, the bolt, for example against the action of the spring pushing onto the latching projections. This may be accomplished by the manual pressure onto the base surface of the hand switch.

To protect it from unintentional actuation, the hand switch and/or the cap may be surrounded by a collar which is connected to the second component in particular rigidly in terms of movement, and/or which is monolithically formed by the second component. The collar may be formed by a sleeve-like, separate fitting which forms a part of the receptacle. In the fitting, the hand switch may be held by retention means functioning as a stop collar at least in the insertion direction in a displaceable manner. Such retention means may be, for example, a retainer ring or a step.

A free end of the first component may protrude into the hand switch in the latched state of the first and second components.

According to a further embodiment, it is possible to combine the release of the latching connection with the simultaneous pushing of the first component out of the receptacle. Thereby, the connection between the first and the second components may be released and the first component may be ejected in one single movement. This may be achieved in a simple manner if a pushing-out surface overlapping the end of the first component in the insertion direction and being displaceable opposite to the insertion direction and facing opposite to the insertion direction is connected to the release shoulder. The distance of the pushing-out surface from the first component is preferably smaller than the length of the release path of the release shoulder. The release path is the path the release shoulder passes over for releasing the latching connection. It extends from a latching position in which the release shoulder is located with the latching projection completely latched in the latching recess to an end position of the release shoulder in the latching recess. Since the distance is smaller than the release path, in this embodiment, the pushing-out surface presses against the free end of the first component before the release shoulder has reached its end position. In the last section of the release path, the pushing-out surface pushes the first component out of the receptacle opposite to the insertion direction.

Advantageously, a release position is located between the latching position and the end position of the receiving shoulder. In the release position, the latching projection is already resting on the release shoulder and is located at the level of the shoulder opposite the release shoulder. This facilitates the ejection of the first component because the latching projection may slide from the release shoulder onto the opposite shoulder during the further movement of the hand switch into the release position.

The displaceable release shoulder and the latching projection together form a positive arrest since the force acting on the release shoulder by the hand switch may overcome the latching. The shoulder of the latching recess cooperating with the release shoulder, however, forms a positive locking with the latching recess which cannot be cancelled by forces acting against the insertion direction without destruction.

The free end of the first component may have a smaller diameter than the subsequent section of the first component. In particular, the section adjacent to the free end may have a diameter which is at least as large as the diameter at the point of the at least one latching projection. This embodiment ensures that the first component may be pushed through the openings of the second component without the latching projections being deflected.

One of the two components may furthermore be provided with one or two circumferential projections and/or indentations which form, together with spring elements of the other component, a positive arrest which at least temporarily secures the position of the first component relative to the second component at given positions. For example, the first component may be provided with at least one projection and/or at least one indentation which cooperates with at least one spring of the second component.

The latching arrangement may in particular be a part of a component for lifting, fastening and/or lashing loads. The first component may be a bolt, and the second component may be a bow- or eye-like part having two limbs penetrated by the bolt. The latching recess may be arranged at one of the limbs, in particular the rear limb in the insertion direction of the bolt. A spring cooperating with circumferential indentations or projections of the bolt may be arranged at the other limb. One of the indentations and/or projections of the bolt is preferably located near a bolt head, another indentation and/or another projection is located closer to the free end of the bolt. In this manner, the bolt may be preliminarily fixed in two positions inserted to different degrees before it is latched.

The spring element for securing the first component outside the latching position may be a leaf spring polygonally extending around the first component.

The component may furthermore be provided with indicator means which indicate whether the latching of the first and second components is complete and consequently indicate that the component may be securely used. To this end, the indicator means may be provided with at least one mark which is either only visible from outside the component when the first and second components are latched, or is only visible when the first and second components are not latched. In a variation, two marks may be provided of which only the one is visible when the first and second components are latched, and the other one is only visible when the first and second components are not latched.

Below, the invention will be illustrated by way of example more in detail and with respect to the enclosed drawings with at least some of the further developed features as described above. In accordance with the above illustrations, individual features of the described exemplified embodiment may be omitted if the advantage connected to these features is not relevant in one respective application. Conversely, the exemplified embodiment may additionally comprise above-described features if the respective application requires these features.

For a better understanding, the same reference numerals are used in the drawings for elements corresponding to each other with respect to their function and/or design.

Below, first the design of the latching arrangement 1 is illustrated by way of example with respect to FIG. 1.

Figure 1:
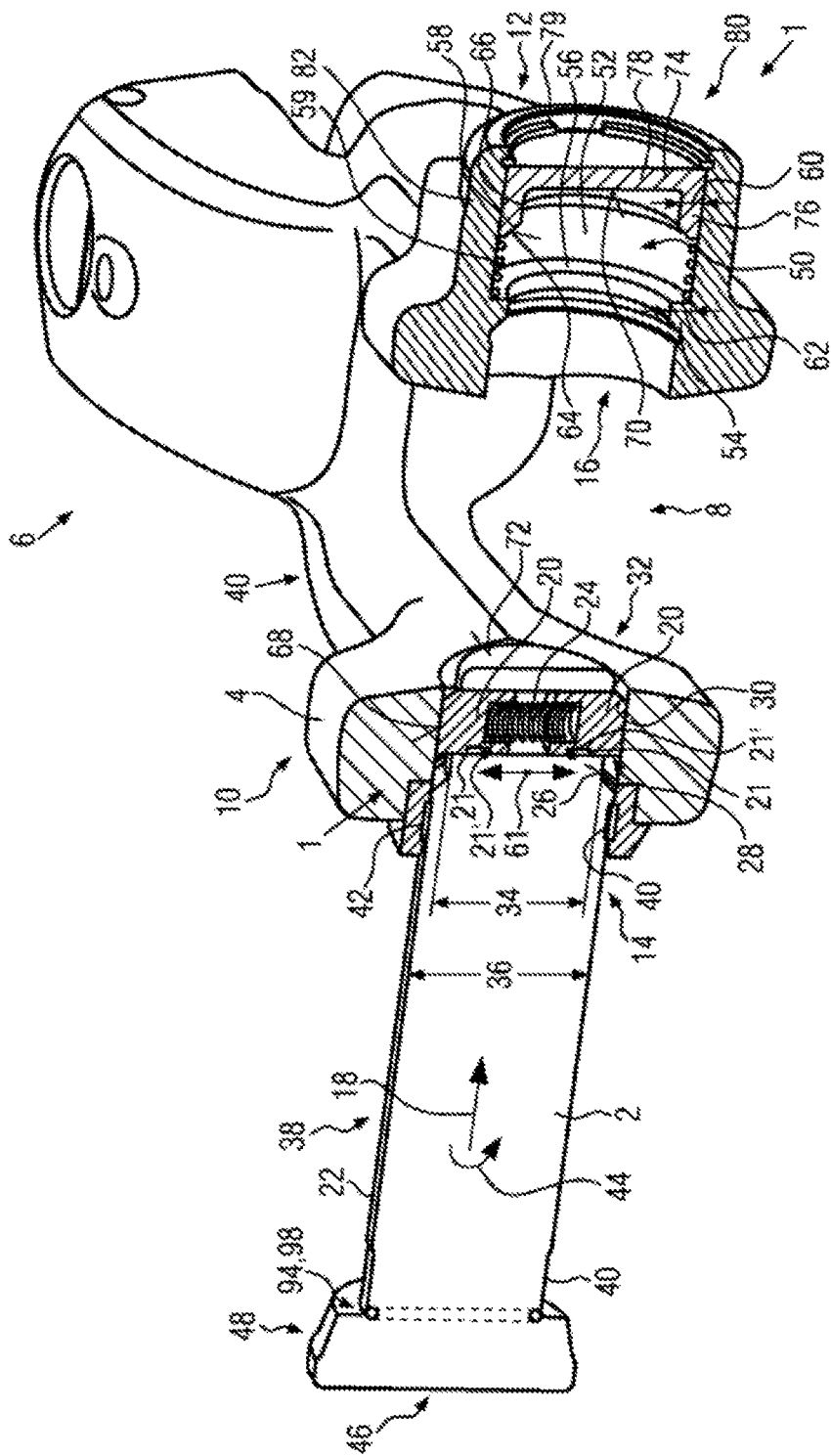
FIG. 1 shows a schematic perspective view of the latching arrangement according to the invention in a first position.
Figure 2:
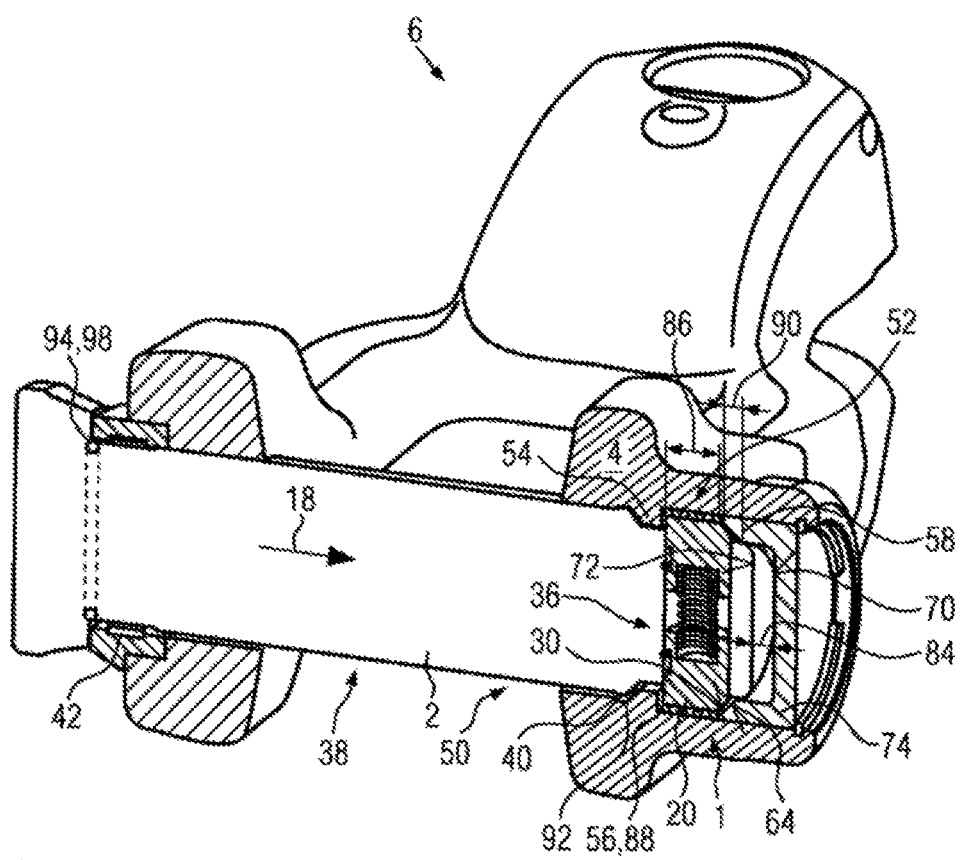
FIG. 2 shows the latching arrangement of FIG. 1 in a second, latched position.

By the latching arrangement 1, a first component 2, represented in a sectional view in FIGS. 1 and 2, is rotatably retained in a second component 4 such that it may be repeatedly released.

As is shown, the first component 2 may be the bolt of a component 6 from fastening, lashing or lifting technology. The bolt may have a diameter of at least 20 mm to more than 50 mm. Examples of such components are shackles, hooks, claws, master links, tensioning devices, catches to be hung into chains, belts or ropes, and the like. The second component 4 forms a basic body of the component 6 which is provided with an opening 8 to be closed by the first component 2. The second component 4 may be in particular designed like a bow with two limbs 10, 12. The limbs 10, 12 are provided with passages 14, 16 which are aligned and through which the first component 2 may be inserted in an insertion direction 18 to close the opening 8 or the second component 4, respectively.

The latching arrangement 1 is split up in the first component 2 and the second component 4, in case of the latter, in particular in one of the passages 14, 16 of the second component 4, here the rear passage 16 in the insertion direction 18.

FIG. 1 shows the opening 8 in an open state where it is not yet closed by the first component 2. The latching arrangement 1 is not yet in the latching position. Belts, chains or other components 6 may be inserted in the opening 8.

The latching arrangement 1 comprises at least one latching projection 20 which is fixed to the first component 2 in a spring-tensioned fashion. As is shown in FIG. 1, in particular two or more latching projections 20 may be distributed around a circumference 22 of the first component 2, preferably equigonally. The spring load is generated by a spring 24 which may be arranged, in case of a plurality of latching projections 20, between the latching projections and may simultaneously be supported at all latching projections 20. If more than two latching projections 20 are provided, instead of the spiral coiled spring represented in FIG. 1, for example an annular leaf spring may be used which is disposed more or less coaxially to the first component 2. The latching projection 20 may be a cylindrical body with a circular or polygonal cross-section. In the first component 2, it may be secured against falling out by a frictional engagement or positive fit. In FIG. 1, the latching projections 20 are shown, by way of example, to be provided with a radially extending recess 21 wherein a securing element 21' retained by the first component 2 is received. The recesses 21 are long enough to ensure the radial displaceability of the latching projections 20.

If no force is acting on the at least one latching projection 20 from outside the first component 2, it projects beyond a tappet surface 26. In the region 28 projecting beyond the tappet surface 26, the latching projection 20 is provided, at its side facing to the insertion direction 18, with a guide bevel 30.

The tappet surface 26 may be located at the end 32 of the first component located in the insertion direction 18 and comprise a circular or polygonal cross-section. A diameter 34 of the tappet surface 26 may be, in this embodiment, smaller than the diameter 36 of the region 38 of the first component 2 located in front of the tappet surface 26 in the insertion direction 18.

The latching projections 20 preferably do not project, in their unloaded rest position, beyond the inner diameter of the passages 14, 16 so that they may be inserted through the passages 14, 16 without any expenditure of force. In particular, the passages 14, 16 may not project beyond the diameter 36.

The first component 2 may be provided, at its circumferential surface 22, with at least one, preferably, however, two retaining recesses 40 spaced apart in the insertion direction and cooperating with a retaining spring 42 in at least one of the passages 14, 16, preferably the front passage 14 in the insertion direction 18. The retaining recesses 40 may continuously extend in a circumferential direction 44 extending around the insertion direction 18 over the circumferential surface 22. The distance between the retaining recesses preferably corresponds approximately to the diameter inside the opening 8. The retaining spring 42 may be designed as a polygonal annular spring which snaps into the retaining recess 40 over the circumference 22. The retaining recesses 40 form, with the retaining spring 42, a positive arrest which secures the first component 2 in two positions in retaining recesses 40 spaced apart in the insertion direction. These two securing positions may be left by applying forces acting in parallel to the insertion direction 18.

At the other end 46, the first component 2 may comprise a head 48 whose diameter is larger than the diameter inside the front passage 14 in the insertion direction 18.

The second component 4 comprises a receptacle 50 for the elements of the latching arrangement 1 located at the first component 2. The receptacle 50 comprises a latching recess 52 which may be annular so that the at least one latching projection 20 may rotate around the insertion direction 18 when it is located in the latching recess. This rotatability prevents a one-sided wear of the first component 2. Moreover, by an annular latching recess, the first component 2 may be latched in any rotational position. If this is not relevant, the latching recess 52 may, of course, only have the shape of a sector. Then, however, the first component 2 may only be latched if the latching projection is aligned with the latching recess. The receptacle 50 may be an integral part of the second component 4, or a separate element fixed to the second component 4.

The latching recess 52 is bounded by a stationary latching shoulder 54 at its front side in the insertion direction 18. The latching shoulder 54 may extend radially so that it forms a perpendicular step or includes an undercut.

The latching shoulder 54 forms, when the latching projection 20 is latched into the latching recess 52, a positive fit that blocks opposite to the insertion direction 18, in particular if the latching projection 20 is embodied at its side located opposite to the insertion direction 18, in the region 28 complementary to the latching shoulder 54 or its latching surface 56 delimiting the latching recess 52. Due to the positive fit between the latching shoulder 54 and the latching projection 20, the first component 2 may only be moved out of the receptacle 50 opposite to the insertion direction 18 without destruction when the latching is released.

To release the latching, the latching recess 52 is bounded by a second shoulder, a displaceable release shoulder 58. The release shoulder is retained in parallel to the insertion direction 18 to be displaceable in the receptacle 50. The release shoulder 58 is pretensioned by an additional spring 59 which extends between the release shoulder 58 and the first component 2, in particular the release shoulder 58 and the latching shoulder 54. In the rest position, the release shoulder preferably assumes a position in which it is moved away from the latching shoulder 54. To release the latching, the release shoulder 58 has to be moved against the action of the additional spring 59. Its height 60 transverse to the insertion direction or in the radial direction 61, respectively, should correspond at least approximately to a height 62 of the latching shoulder in this direction. The height 62 of the latching shoulder may be, depending on the size of the component 6, about 1 cm to about 2 cm.

The release shoulder 58 may be provided with a guide bevel 64 at its surface facing the latching recess 52. The guide bevel 64 of the release shoulder 58 and the guide bevel 30 of the latching projection are inclined with respect to each other so that a force acting in parallel to the insertion direction 18 is outside the cone of friction of this surface/material pair. During a shifting of the release shoulder 58 towards the latching projection 20, no self-locking may thus occur due to frictional forces, and the latching projection 20 and the release shoulder 58 may slide past each other. Due to the guide bevel 30, 64, this sliding motion is connected to a deflection of the latching projection transverse to the insertion direction 18, in the radial direction 61, towards the first component 2 until the latching projection 20 rests on a support surface 66 of the release shoulder 58. Then, a circumferential surface 68 of the latching shoulder 54 is, due to the approximately equal heights 60, 62, in a position where it may be shifted over the latching shoulder 54 opposite to the insertion direction 18. By shifting the release shoulder 58 into the latching recess 52, the latching of the latching arrangement 1 may be consequently cancelled.

It is not compulsory for both the latching projection 20 and the release shoulder 58 to be each provided with a guide bevel 30, 64. It is also sufficient to only provide one guide bevel 30 or 64 as long as it is sufficiently inclined to avoid self-locking.

Conveniently, the release of the latching by the displaceable release shoulder 58 is coupled with a simultaneous pushing-out of the first component 2 from the receptacle 50. To this end, the release shoulder 58 is coupled to a pushing-out surface 70 in a movement-transmitting manner, preferably rigidly in terms of movement. A movement of the release shoulder 58 thus leads to a movement of the pushing-out surface 70 in the same sense and vice-versa. The pushing-out surface 70 overlaps in the insertion direction 18 with an end face 72 of the end 32 of the first component 2. When the release shoulder 58 is axially moved into the latching recess 52, the latching projection 20 is radially pressed in by the guide bevel 64 and then held at the height 60 until the pushing-out surface 70 abuts against the end face 72. When the release shoulder 58 is pushed further into the latching recess 52, the pushing-out surface 70 then pushes the first component 2 out of the receptacle 50.

In a constructively simple manner, the release shoulder 58 and the pushing-out surface 70 may be integrated in a cap 74. The release shoulder 58 will then be part of a collar 76 which surrounds the pushing-out surface 70 and receives the free end 32 when the first component 2 is latched. The pushing-out surface 70 is formed by a cap bottom 78 which appropriately closes the receptacle 50 and thus protects the latching arrangement from the penetration of dirt. The cap 74 may be secured against falling out of the receptacle 50 by retention means 79, for example a retainer ring.

To be able to move the release shoulder 58, it is connected rigidly in terms of movement to a hand switch 80 accessible from outside the latching arrangement 1 or the first and/or second component 2, 4. In the embodiment of FIG. 1, the hand switch 80 is formed by the cap bottom 78. To release the first component 2 and the second component 4, the user only has to push the cap bottom 78, whereby the release shoulder 58 will then be pushed into the latching recess 52, and the second component 4 will simultaneously be pushed out of the receptacle 50. A falling out of the first component 2 is prevented by the positive arrest with the retaining recess 40 and the spring 42.

The hand switch 80 is preferably a plane or at most slightly curved surface whose diameter at least corresponds to the diameter of a thumb, i. e. at least 15 mm.

On the side facing away from the cap 74, the receptacle 50 is closed by the region 38 of the first component 2 whose front region abuts against the latching shoulder 54.

The receptacle 50 may be embodied completely or at least partially by a separate, sleeve-like fitting 82. The fitting 82 is attached, for example, to the basic body of the second component 4 at the side of the passage 16 located in the insertion direction 18. The latching shoulder 54 may be part of the second component 4.

FIG. 2 shows the latching arrangement 1 in a latched state. The latching projection 20 is latched in the latching recess 52. The spring force acting on the latching projection 20 pushes, via the at least one guide bevel 30, 64, the release shoulder 58 out of the latching recess 52 in the insertion direction 18. The distance 84 between the pushing-out surface 70 and the end face 72 of the first component 2 preferably in the direction of displaceability of the release shoulder 58, i. e. in the exemplified embodiment in parallel to the insertion direction, is smaller than a length 86 of the release path of the release shoulder 58 which the release shoulder 58 passes over from the latched position represented in FIG. 2 to its end position. In the end position, the release shoulder 58 or the cap 74 strikes against a stop collar 88 which is formed, for example, by the latching surface 56 of the latching shoulder 54. In this manner, it is ensured that the pushing-out surface 70 can push the first component 2 out of the receptacle 50.

Before the pushing-out surface 70 strikes against the end face 72, i. e. in a position between the latching position shown in FIG. 1 and the end position of the release shoulder 58, there is a release position in which the latching projection 20 is pushed in by the release shoulder 58 against the spring action to such an extent that it may be pushed past the latching shoulder 54. This may be achieved in a simple manner if in the latching position, the latching projection 20 abuts against the release shoulder 58 under spring tension, and the length 90 of the release shoulder 58 parallel to the insertion direction is smaller than the distance 84. For the latching projection 20 to be securely lifted by the release shoulder 58, its length 91 in the insertion direction is longer than the length 90 without considering the guide bevel 30 (FIG. 3).

As can be furthermore seen in FIG. 2, an annular groove 92 may be arranged at the second component 2 in the insertion direction 18 before the release shoulder 58. The annular groove 92 may receive a circumferential latching projection 40 at a shoulder of the first component 1, before the transition to the end 32, in the region 38. This additionally secures the first component 2 in the second component 4 when the latching is released.

The represented latching arrangement may be further varied. Thus, more or less latching projections 20 may be provided. The latching may furthermore be located at the first passage 14 in the insertion direction 18 when the latching projections are arranged at the corresponding position near the head of the first component 2. However, in such a variation, the automatic ejection upon the release of the latching may be less easily effected than in the variation represented in FIGS. 1 and 2 since, instead of a cap-like hand switch 80, now an annular hand switch must be used.

Figure 3:
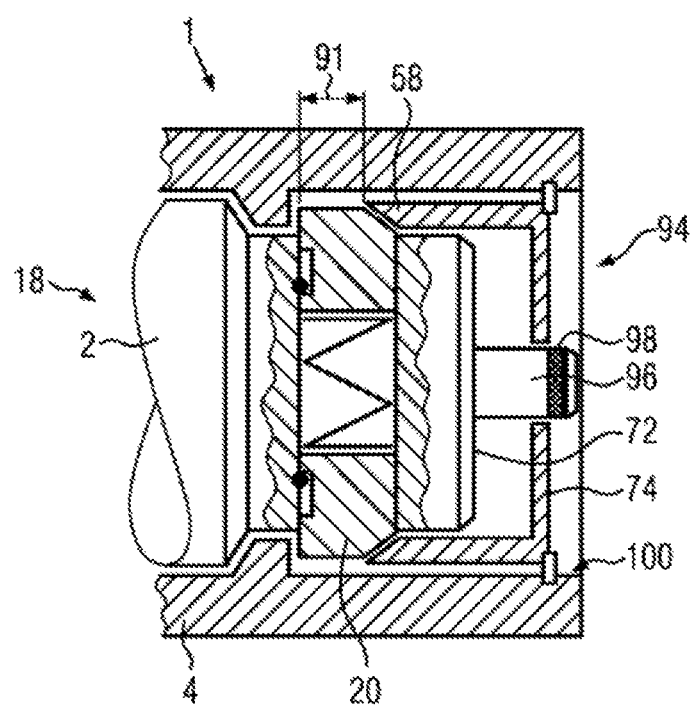
FIG. 3 shows a schematic representation of a variation of a latching arrangement 1.

It is finally, as is shown in FIG. 3, also possible for the latching arrangement 1 to be provided with indicator means 94 which indicate that the latching arrangement 1 has reached a complete latching which is optically visible from outside the latching arrangement 1 and the components 2, 4. In a simple embodiment, the indicator means 94 may comprise a tappet 96 which is coupled to the first component at least in a movement-transmitting manner, preferably, however, monolithically. The indicator means 94 may be provided with at least one mark 98 which is only visible from outside when the latching between the first component 2 and the second component 4 is complete. The mark 98 may be a coloured, for example green ring at one end of the tappet 96.

In FIGS. 1 and 2, a further form of indicator means 94 with a mark 98 is shown which is only visible when the first component 2 and the second component 4 are not latched. At least one mark 98 is located at a point of the first component 2 which is covered by the second component 4 when the two components 2, 4 are completely latched, for example because it is then located in a passage 14, 16. The mark 98 may be, for example, a coloured ring at the transition to the head 48 of the first component 4.

In a further variation, the indicator means 94 may also be provided with at least two marks 98 of which at least one is only visible when the first and second components are latched, and at least one other mark is only visible when no latching is yet completed.

This embodiment may in particular be combined with a spring-tensioned release shoulder 58 where the additional spring is arranged between the release shoulder 58 and the second component 4 (FIGS. 1 and 2). Preferably, the additional spring pushes the release shoulder 58 into the latching position so that the mark 98 is actually only visible when the latching arrangement 1 is properly latched.

In FIG. 3, as, by the way, also in FIG. 2, one can see that the cap 74 forming the hand switch 80 may be surrounded by a collar 100 outside as a protection.

REFERENCE NUMERALS

1: latching arrangement
2: first component
4: second component
6: component from fastening, lashing or lifting technology
8: opening
10: limb
12: limb
14: passage in a limb
16: passage in a limb
18: insertion direction
20: latching projection
21: recess in the latching projection
21': securing element
22: circumference of the first component
24: spring
26: tappet surface
28: region of the latching projection projecting from the tappet surface
30: guide bevel of the latching projection
32: end of the first component in the insertion direction
34: diameter
36: diameter
38: region of the first component located in front of the tappet surface in the insertion direction
40: retaining recesses or projections
42: retaining spring
44: circumferential direction
46: other end of the first component
48: head of the first component
50: receptacle
52: latching recess
54: latching shoulder
56: latching surface of the latching shoulder
58: release shoulder
59: additional spring
60: height of the release shoulder
61: radial direction
62: height of the latching shoulder
64: guide bevel
66: support surface
68: circumferential surface of the latching shoulder
70: pushing-out surface
72: end face of the first component
74: cap
76: collar
78: collar bottom
79: retention means
80: hand switch 82: separate fitting
84: distance between the pushing-out surface and the end face
86: length of the release path
88: stop collar
90: length of the guide bevel of the release shoulder in the insertion direction
91: length of the latching projection in the insertion direction
92: annular groove
94: indicator means
96: tappet
98: mark
100: collar

The invention claimed is:

1. Latching arrangement for a component from lifting, lashing or fastening technology, having a first component provided at its one end with at least one laterally protruding, spring-tensioned latching projection, and having a second component provided with a receptacle configured to receive in an insertion direction and to fasten the end of the first component such that the end of the first component is rotatable in the second component, and which second component comprises a latching recess for the latching projection, wherein the latching recess is bounded at least at one side by a release shoulder displaceable into the latching recess which is provided with a hand switch arranged so as to be accessible from outside the latching arrangement, which hand switch is connected in a movement-transmitting manner to the release shoulder and closes the receptacle.

2. Latching arrangement according to claim 1, wherein a height of the release shoulder corresponds at least to a height of a latching shoulder opposite the release shoulder against the insertion direction.

3. Latching arrangement according to claim 1, wherein the release shoulder is provided with a guide bevel facing the latching projection, and/or the latching projection is provided with a guide bevel facing the release shoulder.

4. Latching arrangement according to claim 3, wherein an angle of the guide bevel is, relative to the direction in which the release shoulder is displaceable, outside a cone of friction onto an opposite surface of the release shoulder and/or the latching projection associated to the guide bevel.

5. Latching arrangement according to claim 1, wherein the release shoulder is, when the latching projection is located in the latching recess, pushed out of the latching recess by the latching projection.

6. Latching arrangement according to claim 1, wherein the latching recess is annular.

7. Latching arrangement according to claim 1, wherein the release shoulder is annular.

8. Latching arrangement according to claim 1, wherein the release shoulder is displaceable into the latching recess up to a stop collar to an opposite latching shoulder opposite to the insertion direction.

9. Latching arrangement according to claim 1, wherein the hand switch comprises a cap.

10. Latching arrangement according to claim 9, wherein the release shoulder is formed by a collar of the cap forming the hand switch.

11. Latching arrangement according to claim 10, wherein the cap is displaceably held in the receptacle.

12. Latching arrangement according to claim 10, wherein in the latched state of the first and second components, the end of the first component is received in the cap at least in sections.

13. Latching arrangement according to claim 9, wherein the cap is displaceably held in the receptacle.

14. Latching arrangement according to claim 13, wherein in the latched state of the first and second components, the end of the first component is received in the cap at least in sections.

15. Latching arrangement according to claim 9, wherein in the latched state of the first and second components, the end of the first component is received in the cap at least in sections.

16. Latching arrangement according to claim 1, wherein a pushing-out surface displaceable opposite to the insertion direction and overlapping the first component in the insertion direction is connected to the release shoulder, wherein a distance of the pushing-out surface to the first component is smaller than the length of a release path the release shoulder passes over during the movement from a latching position which the release shoulder assumes with the latching projection latched in the latching recess, and an end position in the latching recess.

17. Latching arrangement according to claim 1, wherein an indicator device with at least one mark is provided at the first component, and the mark is arranged so as to be visible from outside either only when the latching projection is latched or only when the latching projection is not latched.

18. Latching arrangement according to claim 1, characterized in that the latching projection is lying in the shadow of the second component at least in the insertion direction of the first component.

19. Component from fastening, lifting, or lashing technology, having a latching arrangement according to claim 1, wherein the first component is a bolt closing an opening of the second component.

20. Component from fastening, listing, or lashing technology according to claim 19, wherein the second component is bow-shaped.

* * * * *